3,298,842
PROCESS FOR PREPARING HOLLOW REFRACTORY PARTICLES

Ludwig Edward Seufert, Boothwyn, Pa., assignor to E. I. du Pont de Nemours and Company, Wilmington, Del., a corporation of Delaware
No Drawing. Filed Mar. 22, 1963, Ser. No. 267,338
12 Claims. (Cl. 106—65)

This invention relates to a process for the preparation of a new and useful refractory. More specifically, it is concerned with hollow alumina particles.

It is known to prepare hollow bubbles of alumina by subjecting a thin stream of molten alumina to a powerful blast of air (U.S. Patent 2,340,194) but the process is limited to the production of substantially spherical particles and requires extremely high temperatures. The utility of such particles has been limited by the necessity of using relatively low melting substances as binders in making a porous massive object.

It is an object of the present invention to provide a simple and relatively low temperature process for the preparation of hollow particles of alumina or refractory compounds containing alumina.

Another object is to provide a process for the preparation of hollow refractory particles that are self-binding.

In the process of this invention, a substantially uniform, porous admixture of a plurality of aluminum or aluminum alloy particles, refractory diluent particles and a catalyst are heated at a temperature above about 650° C. and below the temperature at which any substantial self-bonding or sintering of the refractory diluent occurs, in the presence of gaseous oxygen for a period of time sufficient to oxidize at least about 11% of the aluminum. The hollow particles of alumina or refractory compounds containing alumina resulting from the oxidation process are then separated from the refractory diluent.

The aluminum component employed in the starting composition is in the form of particles having one dimension of between about 0.5 and 500 mils, preferably 200 mils, and a second and third dimension of at least 0.5 and 7 mils respectively. The length of any particle is not critical but preferably should be less than 2 inches. In addition to aluminum itself, alloys of aluminum with other metals in which aluminum constitutes the major component may be used. This component can be present in a wide variety of particle sizes and shapes. If spheres are used they should have a diameter of between 7 and 500 mils. Cylindrical rods such as fibers should have a diameter of between 0.5 and 500 mils and a length of at least 7 mils. Many other forms such as foil, needles, granules, etc., can be used to afford a large variety of final shapes.

The refractory diluent particles which are employed in the starting composition, may be either inert to the process or reactive in the process in the sense that they combine with aluminum in its oxidized form to form compounds or solid solutions. Preferably the refractory diluent particles have a size smaller than the aluminum particles.

By the expression "refractory diluent" is meant a substance that will not melt and preferably not sinter at the temperatures used in the process.

By the expression "inert to the process" is meant a substance that will not react with aluminum or alumina under the conditions of the process. Alumina itself, oxides of cerium, hafnium, lanthanum and zirconium; carbides of aluminum, boron, hafnium, niobium, tantalum, thorium, titanium, tungsten and zirconium, as well as stable nitrides and borides of the aforementioned metals may be used.

By the expression "reactive in the process" is meant a substance that will react with aluminum or alumina to give an alumina-containing compound. Such as reaction serves to extend the reaction domain of the aluminum. For example, magnesia or its precursors will react to form spinel ($Al_2O_3 \cdot MgO$). Silica-containing compounds such as vermiculite, talc or asbestos can form mullite in the reaction. Greater amounts of refractory diluent must be used when the diluent is reactive than in the case where it is inert to the process. This is necessary in order to minimize agglomeration of the in situ oxidized particles whch in the extreme can lead to a continuously bonded structure. Other suitable refractory diluents of the reactive type include calcium oxide, barium oxide, beryllium oxide and other refractory divalent metal oxides as well as carbonates of calcium or magnesium to name a few. Mixtures of both types of refractory diluents may be used if desired.

When employing a refractory diluent inert to the process, at least about five parts of diluent per part of aluminum particles all on a volume basis should be employed. Preferably the ratio should be at least seven parts diluent per part of aluminum particles. On the other hand, when the refractory diluent is a substance which is reactive with aluminum or the in situ formed aluminum oxide, then an amount of at least seven parts, preferably at least ten parts, per part of aluminum particles on a volume basis should be employed.

The particle size of the refractory diluent is not critical. Preferably it should pass a 20-mesh screen. More preferably, the particle size should be small enough so that the reaction product can be recovered by sieving. This will depend upon the size of the aluminum. In general if the refractory diluent is smaller in particle size than the particles of aluminum oxidation product, the latter may be recovered by mechanical sifting.

If the sizes of the diluent and reaction product overlap, then differences in density may be used to separate them as in an elutriation or air classifying process, or if desired, the methods of ore flotation using a suitable flotation adjuvant may be used.

Although relatively pure refractory diluents are shown in the examples which follow it will be obvious that crude, commercially available substances or ores can be used.

In order to permit the product to be recovered readily by a simple mechanical separation, it is preferred that the refractory diluents be of such nature that they do not substantially bond together during the process. Some bonding of the diluent can be permitted if the discrete particle products can survive the separation from the refractory diluent matrix. For this reason clays in general are unsatisfactory. Preferably the refractory diluent will not decompose under the temperature reached.

By suitable selection of a refractory diluent one can recover the products of the invention from the reaction mass by dissolving the refractory. However, due to the labor and expense involved, this method is not preferred.

The catalyst which is employed in the process should be present in the mixture in an amount of at least about 0.02% based on the weight of the aluminum and should be selected from the class consisting of oxides and hydroxides of alkali metals, oxides of alkaline earth metals, vanadium chromium, tungsten, copper, silver, zinc, antimony and bismuth, and precursors of said oxides yielding the indicated amount of catalyst.

Among suitable precursors of catalysts may be mentioned the acetates, benzoates, bismuth thioglycolates, bisulfates, bisulfites, bromates, nitrates, nitrites, citrates, dithionates, ethylates, formaldehyde sulfoxylates, formates, hydrosulfites, hypochlorites, metabisulfites, methylates oleates, oxalates, perchlorates, periodates, persulfates, salicylates, selenates, silicates, stearates, sulfates, sulfites, tartrates, and thiosulfates of the recited metals. While not "per se" within the class of useful fluxing agents, these compounds do, under conditions of the reaction, yield compounds within the above defined class. Thus, sodium acetate, -benzoate, -bismuth thioglycolate, etc., will yield sodium oxide which is an oxide of an alkali metal. In addition, trialkyl tin oxide and lead silicate ($PbSiO_3$) are also useful as fluxing agents.

The catalyst must contact the metal surface during the reaction. The catalyst can be placed on the metal particles before mixing with the refractory diluent by applying dry, in solution, as a gas or as a melt. The catalyst can also be mixed with the refractory diluent or added to the mixture of metal and diluent. Some diluents—notably magnesia—may also serve as a catalyst.

Another means of providing the catalyst is to use an alloy of aluminum with a metal that will yield a catalyst during the reaction, e.g., Al/Mg 90/10% or Al/Li 99/1%.

While an amount of catalyst equal to at least 0.02% based on the weight of the aluminum can be employed, it is preferred that at least 0.5% be present. If the catalyst is to be dispersed in a refractory diluent that is not a catalyst or catalyst precursor then preferably an amount equal to 1.0% of the weight of aluminum should be used. When using alkali metal containing catalyst preferably no more than 2% based on the aluminum should be used.

The reaction mixture is fired in a relatively uncompacted form in order to reduce the opportunity for bonding of the diluent and also to provide a ready access of gaseous oxygen to the aluminum. While a porosity of at least 60% is suitable, a porosity of 70% or greater is preferred.

The temperature and duration of the heating step are co-related functions. They can vary widely depending upon the shape and concentration of the aluminum, the nature of the catalyst, the concentration of the catalyst and the nature of the oxidizing atmosphere. In general, a portion of the oxidation amounting to 10 to 25% of the aluminum should preferably take place between 650° and 800° C. in order to retain the original shape of the metal. Useful products can be recovered from the process at this stage.

If a higher conversion is desired the remainder of the firing can be carried out at temperatures as high as 1600° C. or higher. The maximum temperature selected must be one that affords no melting and preferably no sintering or other binding of adjacent particles in the reaction mixture.

The fully converted discrete particles are hollow with an interior void or cell corresponding in shape and size to the original metal. The wall of the hollow particles is composed of a dense crystalline continuum of fine grain alpha alumina, a compound containing alumina and another oxide or solid solution of an oxide in the above. The wall has a thickness of between about 0.3 mil and the diameter of the enclosed pore or cell and a density function of about 0.5 to 1.0. Particles of the diluent used may be occluded within the wall. The shape of the particle will correspond roughly to the shape of the starting material. Using spheres of aluminum the discrete products will be approximately spherical in shape with a diameter of between about 10 and 600 mils.

Partially converted products are similar to above but contain aluminum in the central void or as small inclusions in the wall itself.

In the following examples, all volumes of reactants are measured in an uncompacted form as by pouring the metal or refractory diluent particles into a wide mouth container such as a beaker or bucket. The porosity may be calculated from the apparent density and the calculated density of the solid material in a body of known composition.

All sieve measurements are made with U.S. sieve series.

The following "density function" may be used as a measure of the density of the structure:

Density function =

$$\text{average}\left[\frac{\text{part of perimeter in contact with other grains}}{\text{total perimeter of grain under consideration}}\right]$$

Products of this invention show values of the above between 0.5 and 1.0.

The density function is determined for each grain by examining a photomicrograph of a polished section of the sample and the results are averaged. Most products of this invention, as made, show no visible grain boundaries after etching and viewing at 750× magnification. In this event the value of the density function approaches an upper limit of 1.0. Grain growth can occur with prolonged heating at, for example, 100 hours at 1600° C. to afford an average grain size of about 8 microns. Further grain growth is limited by the thickness of the wall and the value of the density function approaches the lower limit of 0.5.

The products of this invention are strong and have a high resistance to crushing so that they can be used as a loose insulating fill, or as reinforcements for plastics, glasses, metals, etc.

The discrete particles obtained after between about 11 and 90% conversion of aluminum, are particularly useful. The residual aluminum contained within the particles may appear in the central void, or as small inclusions, about 1 micron or less, in the wall of the hollow particles. An aggregation of such particles can be fired in air to yield useful products. Mixtures containing such particles, temporary binders, and filler refractories as desired are useful for ramming mixtures, refractory castables, and molding mixtures for all types of products.

Example I

A given volume of aluminum particles of the indicated shape is thoroughly wetted with a solution of NaOH in ethanol, drained and dried. This procedure in the case of nearly round aluminum particles of 20/40 mesh, for example, leaves a residue of NaOH on the surface of the aluminum in the amount of about 0.2, 0.45, and 0.9% of the weight of aluminum for 1, 2 and 4% solutions respectively.

The dried, coated aluminum particles are thoroughly mixed with a given volume of a powdered refractory diluent. The mixture is poured into an alumina crucible. The porosity of the porous mixtures of samples A–P in Table I range from 65 to 75%. The crucible is placed in an oven with an air atmosphere and heated to the desired temperature according to the firing schedule:

Heat from
  20° C. to 650° C. in 6 hours and hold 12 hours;
  650° C. to 750° C. in 2 hours and hold 12 hours;
  750° C. to 1000° C. in 3 hours and hold 12 hours;
  1000° C. to the temperature indicated in Table I in 4 hours and hold 24 hours.

The crucible and contents is cooled and the cold reaction mixture is screened through a 100-mesh screen to remove the unreacted refractory diluent.

The following refractory diluents are used:

I. MgO—dead burned magnesite (96% MgO), passes a 200-mesh screen. Compressed (e.g., 6000 p.s.i.) bricks of this sample sinter or bind at a temperature of 1300° C. to give a product with a flex strength of 1000 pounds per square inch which would not permit simple recovery of the product particles.

II. MgO—(96% MgO) passes a 200-mesh screen 100%. This magnesia appreciably binds when heated at 1000° C. in a compressed state.

III. Al$_2$O$_3$—Ignited powder passes a 100-mesh screen. 65% retained on 200-mesh screen.

The following forms of aluminum are used:

Grained ingot (G.I.).
Wool, commercial grade (alloy 3003), average diameter of about 10 mils and 0.02–0.25 inch long.
Flake about 4 to 20 mesh.
Foil (pure Al) 3 mil thick cut to about 10 x 200 mil strips.
Wire (alloy 99.4% pure) 10 mil diameter x 0.5″ long.
Needles (99% pure) approximately 0.20″ long x 0.030″ diameter.

Results are presented in Table I. The oxidation of aluminum is less than 100% in some cases. Inspection shows that metallic aluminum remains in these samples. In other cases, there is shown an excess of product over the theoretically calculated spinel or alumina. This is a measure of the degree of accretion of the matrix material by the oxidizing aluminum either by engulfing matrix particles or bonding them without chemical reaction. The product may contain from 0 to 50% of the diluent as accretion based on the weight of the recovered particles.

Items B, G, H, I, and J illustrate the use of MgO as the catalyst.

When the preparation of item M (Al$_2$O$_3$ diluent) is repeated without using the NaOH catalyst the original aluminum particles are recovered essentially unchanged with little or no weight gain.

The coarser particles retained by the screen (6 to 80 mesh) in the final step of the process have a shape approximating that of the original metal particles and have a bulk density in general of from 0.40 to 1.6 gram/cm.$^3$. Examination of polished sections of plastic-mounted particles shows that the fully converted particles are hollow with an interior void or cell corresponding in shape and size to the original metal particle. The wall is composed of a dense (density function of 0.5 to 1.0) crystalline continuum of fine grain alpha alumina (items K–P) or spinel (items A–J). The walls have a thickness of between about 0.3 mil and the diameter of the enclosed pore or cell. Particles of the refractory diluent are occluded within the walls.

Items B, L, M, and P contain unreacted aluminum in the central cell. Item L, in spite of the fact that the product weighed the theoretical amount, showed under the microscope some unreacted aluminum in the cells. The discrepancy is explained by accretion of matrix alumina.

ered on a 100-mesh screen contain 29% aluminum and 71% Al$_2$O$_3$ representing about 56% conversion of the aluminum. One part of the discrete particles is mixed with 0.02 part of 33% aqueous gum arabic as a temporary binder and 0.005 part sodium hydroxide and molded to a ⅜ x ⅜ x 2 inch shape under 5000 p.s.i. pressure. The molded form is dried and then heated to 1500° C. where it is held for 24 hours in an air atmosphere. The product is a strong (3000 p.s.i. flexural strength), porous refractory shape.

Other suitable temporary binders include solutions of carboxy methyl cellulose, rubber, polyvinyl alcohol, polyvinyl pyrollidone, natural gums, glue and the like to increase the green strength of the shaped object. A self-bonding additive such as Sorel cement (2MgO·1MgCl$_2$·6H$_2$O)

or a mixture of magnesium oxide and saturated sodium chloride can also be used for this purpose. Preferably a material is used that will burn out under the firing conditions. From about 0.1% to about 2% binder is usually adequate.

What is claimed is:

1. A process for preparing hollow particles of refractory compounds which comprises forming a substantially uniform, porous admixture of (1) metal particles of the class consisting of aluminum, and alloys thereof in which aluminum constitutes the major component, said metal particles having one dimension between about 0.5 and 500 mils and a second and third dimension of at least 0.5 and 7 mils respectively, (2) refractory diluent particles in an amount of at least 5 parts refractory particles per part of metal particles all on a volume basis, and (3) at least 0.02% by weight based on the weight of aluminum, of a fluxing agent selected from the class consisting of oxides and hydroxides of alkali metals, oxides of alkaline earth metals, vanadium, chromium, tungsten, copper, silver, zinc, antimony, and bismuth and precursors of said oxides, the said admixture having a porosity of at least about 60%, placing the admixture in an oven, gradually heating the admixture to a temperature of at least 650° C. but below that temperature at which self-bonding of the refractory diluent occurs, continuing to fire the admixture at a temperature in this range and in the presence of an oxygen-containing atmosphere, until at least about 11% by weight of the aluminum is oxidized and separating the hollow particulate product from unreacted diluent.

TABLE I

| Item | Aluminum | | | | Diluent | | Vol. Diluent Volume Al | Firing Schedule Hours at, ° C. | | Catalyst | Weight of Sifted Product (g.) |
|---|---|---|---|---|---|---|---|---|---|---|---|
| | Form | Mesh | Wt. (g.) | Percent | Type | Mesh | | 1,100 | 1,500 | | |
| A | G.I. | 60 | 75 | 8.2 | MgO+ | −200 | 10 | 24 | | a | 330 |
| B | G.I. | 30/60 | 120 | 4.9 | MgO+ | −200 | 7 | 24 | | b | 101 |
| C | Wool | 60 | 4 | 2.6 | MgO | −200 | 10 | 16 | | a, 1% | |
| D | do | 60 | 4 | 2.6 | MgO+ | −200 | 10 | 16 | | a, 1% | |
| E | Wire | (10 mil) | 35 | 5.9 | MgO+ | −200 | 10 | 24 | | a | |
| F | Wool | 60 | 16 | 2.6 | MgO+ | −200 | 10 | 24 | | a | 53 |
| G | do | 60 | 16 | 2.6 | MgO+ | −200 | 10 | 24 | | b | 56 |
| H | do | 60 | 30 | 4.9 | MgO+ | −200 | 7 | 24 | | b | 101 |
| I | Flake | 4/20 | 40 | 6.4 | MgO+ | −200 | 7 | 24 | | b | 116 |
| J | M.G. | | 22 | 3.6 | MgO+ | −200 | 7 | 24 | | b | 72 |
| K | Foil | | 5 | 3.5 | Al$_2$O$_3$ | −100 | 10 | | 24 | a, 4% | 5.0 |
| L | do | | 5 | 3.4 | Al$_2$O$_3$ | −100 | 6 | | 6 | c, 40% | 12 |
| M | G.I. | 10/20 | 115 | 12.5 | Al$_2$O$_3$ | −100 | 10 | | 6 | a | 140 |
| N | G.I. | 10/20 | 65 | 11.7 | Al$_2$O$_3$ | −100 | 10 | | 24 | a | 126 |
| O | Wire | | 5 | 3.6 | Al$_2$O$_3$ | −100 | 10 | | 24 | a, 4% | 14 |
| P | Needles | | 44 | 8.2 | Al$_2$O$_3$ | −100 | 10 | | 24 | a | 61 |

+Dead burned magnesite as identified under I above. Other is MgO as identified under II above.
a-NaOH (2% solution) except as noted.
b-No added catalyst.
c-Na$_2$SiO$_3$.

*Example II*

Discrete particles are made by firing a loose mixture containing 1 volume of aluminum particles (10/20-mesh grain ingot) coated with 1.0% NaOH and 10 volumes of −100-mesh Al$_2$O$_3$ for 24 hours at 1500° C. (after stepwise heating similar to Example I). The particles recov- 2. The process of claim 1 wherein the separation is accomplished by sifting the fired mixture.

3. The process of claim 1 wherein no more than about 90% of the aluminum is converted to the oxide.

4. The process of claim 1 wherein part of the refractory particles react with the in situ oxidided aluminum.

5. The process of claim 4 wherein the refractory diluent particles are magnesia.

6. The process of claim 1 wherein the refractory diluent particles are inert to the process.

7. The process of claim 6 wherein the refractory diluent particles are alumina.

8. A process for preparing hollow particles of alumina or refractory compounds containing alumina comprising forming a substantially uniform, porous admixture of (1) aluminum particles having one dimension of between about 0.5 and 500 mils, and a second and third dimension of at least 0.5 and 7 mils respectively, and (2) refractory diluent particles, the ratio of refractory particles to aluminum being at least 5 to 1 on a volume basis, and (3) at least 0.02% based on the weight of the aluminum of a fluxing agent of the class consisting of oxides and hydroxides of alkali metals, oxides of alkaline earth metals, vanadium, chromium, tungsten, copper, silver, zinc, antimony and bismuth and precursors of the above, the said admixture having a porosity of at least about 60%, placing the admixture in an oven, gradually heating the admixture to a temperature of at least 650° C. but below that temperature at which self-bonding of the refractory diluent occurs, continuing to fire the admixture at a temperature in this range and in the presence of an oxygen-containing atmosphere until at least 11% by weight of the aluminum is oxidized and separating the hollow particles of alumina or refractory compounds containing alumina from unreacted refractory diluent.

9. The process of claim 8 wherein the refractory diluent is alumina.

10. The process of claim 8 wherein the refractory diluent is magnesia.

11. The process of claim 8 wherein the firing is continued until between about 11 and 90% of the aluminum has been oxidized.

12. The process of claim 8 wherein the separation of the hollow particles is accomplished by dissolution of the unreacted refractory matrix material.

References Cited by the Examiner

UNITED STATES PATENTS 2,741,822  4/1956  Udy _____ 106—65

TOBIAS E. LEVOW, *Primary Examiner.*

J. POER, *Assistant Examiner.*